April 7, 1936.  J. HELENBERG  2,036,631
STEAM VALVE GEAR
Filed March 8, 1935  4 Sheets-Sheet 1
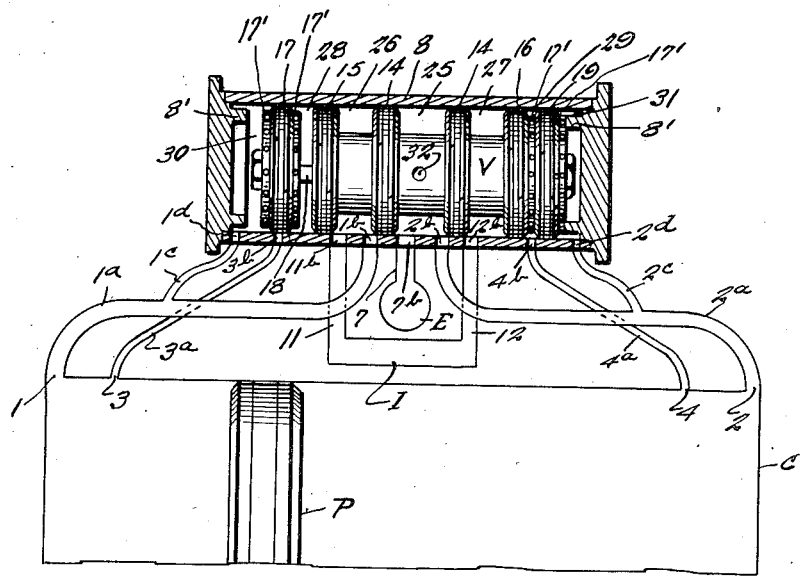
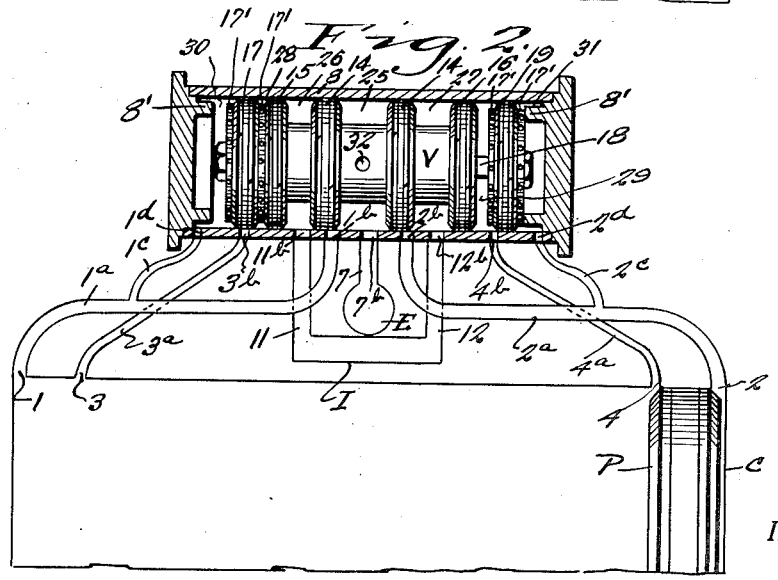
Inventor
John Helenberg
By Clarence A. O'Brien
Attorney

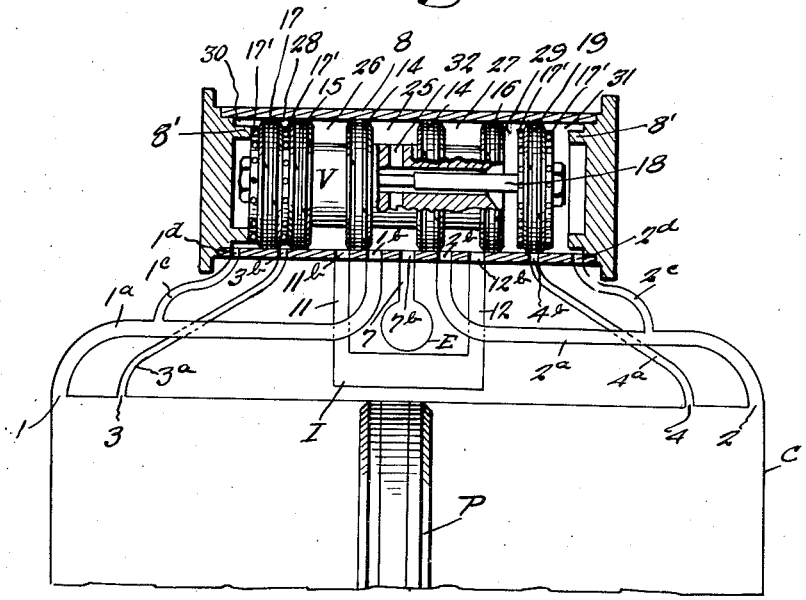
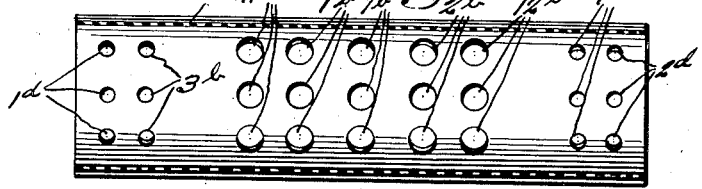
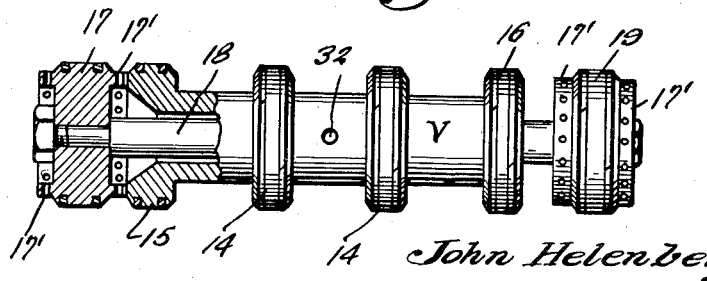

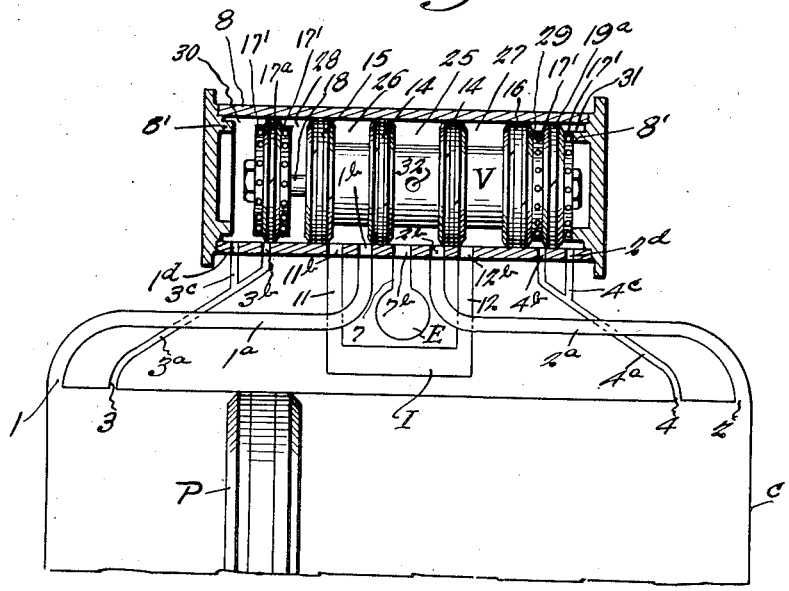

April 7, 1936.    J. HELENBERG    2,036,631
STEAM VALVE GEAR
Filed March 8, 1935    4 Sheets-Sheet 4
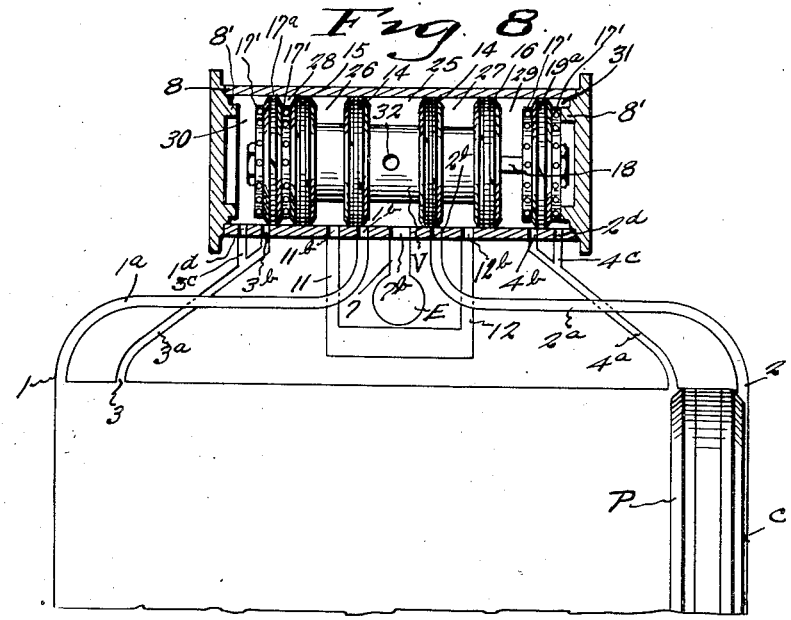
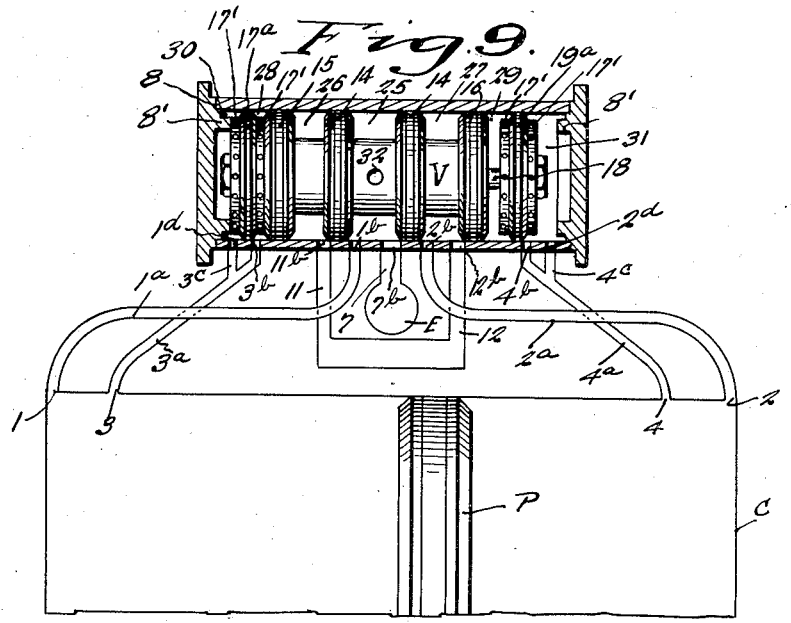
Inventor
John Helenberg
By Clarence A. O'Brien
Attorney Patented Apr. 7, 1936

2,036,631

UNITED STATES PATENT OFFICE 2,036,631

STEAM VALVE GEAR

John Helenberg, Houston, Tex.

Application March 8, 1935, Serial No. 10,100

3 Claims. (Cl. 121—150)

This invention relates to a steam valve gear and the object of the present invention is to improve upon the valve gear forming the subject matter of Patent 1,759,399, granted to me under date of May 20, 1930.

The present invention is also an improvement on that covering the subject matter of an application filed by me on December 7, 1933, Serial No. 701,369.

The important object of the present invention is to make the gear more positive in its operation, that is, to eliminate the kick-back working against the back pressure and to make the insertion of the valve into the casing of the valve substantially foolproof, that is regardless of how or what position the valve may be in the valve casing it will automatically center itself in position upon the admission of steam into the valve casing.

The present invention together with its objects and advantages will be best understood from a study of the following description taken in connection with the accompanying drawings wherein:

Figures 1, 2 and 3 are sectional views showing parts of the device in different positions.

Figure 4 is an elevation of the casing for the slide valve.

Figure 5 is a sectional elevational view of the slide valve.

Figure 6 is a view similar to Figure 1 showing a slightly modified form of the invention.

Figure 7 is a sectional elevational view of the modified form of slide valve.

Figures 8 and 9 are views similar to Fig. 6 but showing the parts in different positions.

Referring to the drawings in detail, it will be seen that the letter C represents a cylinder with a piston P mounted for reciprocation therein.

Whereas in the valve gear disclosed in my aforementioned patent, there were provided three ports at each end of the cylinder C, in the present invention there is provided but a pair of ports at each end of said cylinder, the ports at one end being indicated by the reference numerals 1 and 3, and the ports at the opposite end of the cylinder C being designated by the reference characters 2 and 4.

In accordance with the present invention conduits 1a, 3a, 2a, 4a, lead respectively from ports 1, 3, 2 and 4 to ports 1b, 3b, 2b, and 4b. Also, the conduits 1a and 2a are provided with branches 1c and 2c that lead to ports 1d and 2d provided in the valve casing 8. (See Figures 1 to 3 inclusive.)

Further, in accordance with the present invention, there is provided a single exhaust E which is connected through the medium of a conduit 7 with a centrally located port 7b provided in the casing 8. On opposite sides of the port 7b the casing 8 is provided with ports 11b, 12b which are connected by conduits 11, 12 to a steam intake I.

A valve V is slidably mounted in the cylindrical casing 8 and includes an elongated body having two enlargements 14—14 intermediate its ends and enlargements 15 and 16 at its respective ends. The slide valve V is slidably mounted upon a tie rod 18 to which auxiliary valves 17 and 19 are secured at the ends of the rod. The slide valve V has a port 32 extending therethrough and bisecting the bore which accommodates the rod 18. The port or passage 32 as shown is located between the enlargements 14—14. The enlargements 14 provide therebetween, within the casing 8 a chamber 25 while the enlargement 15 and the adjacent enlargement 14 provide therebetween a chamber 26 and the enlargement 16 and the other enlargement 14 provide therebetween a chamber 27. Also, there is provided within the casing 8 between the enlargement 15 and the auxiliary valve 17 a chamber 28 while a chamber is also provided between the enlargement 16 and the auxiliary valve 19, and this latter chamber is indicated by the reference numeral 29. There are also, provided two end chambers one being formed between one end wall of the casing 8 and the auxiliary valve 17 and indicated by the reference numeral 30 while the other is formed between the opposite end of the casing 8 and the auxiliary valve 19 and is indicated by the reference numeral 31. Annular flanges 8' are connected to or formed with the ends of the casing 8 to limit the sliding movement of the valve parts and to prevent the valve parts moving beyond the positions shown in Figs. 1, 2, 3, 6, 8 and 9. Also perforated flanges 17' are formed on the faces of the valves 17 and 19 to permit steam to pass these faces and reach the bore of the valve V when said flanges are abutting the ends of said valve V. The flanges 17' abut the flanges 8' when the valve assembly reaches the ends of its strokes.

From the above detailed description the operation of the device will be understood from the following:

The main positions of the valve V and the auxiliary valves 17 and 19 have been illustrated in Figs. 1, 2 and 3. Supposing the parts to be located as shown in Fig. 1 and the piston P is moving from the left to right, it will be seen that the steam from the intake I passes through conduit 11, port 11b, chamber 26, conduit 1a into the cylinder C at the left hand end of the cylinder forcing the piston toward the right in Fig. 1. At the same time the live steam will enter chamber 30 in an amount sufficient to hold valves 17 and 19 in the position illustrated in Figs. 1 and 2. The steam will also be admitted from the cylinder C into the conduit 3a, but passage of the steam from the cylinder C from the conduit 3a into the casing 8 will not be admitted by reason of the fact that the port 3b will, as shown in Fig. 1, be closed by the auxiliary valve 17.

It will also be apparent that under such conditions steam in the cylinder C at the right hand side of the piston P is simultaneously being ejected through port 4, and conduit 4a into chamber 29, passing around the tie rod 18 through the bore in the slide valve V to the passage 32 where it exhausts from the chamber 25. The steam is further being exhausted through port 2, conduit 2a, port 2b, chamber 25, and conduit 7 to the exhaust E. When the piston approaches the right hand end of the cylinder C, it will close port 4, and when it reaches the terminus of its movement in this direction, port 4 will be open as clearly illustrated in Fig. 2 whereby the live steam coming from port 1 passes through port 4, conduit 4a and into chamber 29 where it will build up a pressure so as to cause the valve V to move to the position shown in Fig. 2 resulting in the closing of communication between port 11b, chamber 26, port 1b as well as the closing of communication between ports 2b and 7b in chamber 25.

Attention is called to the fact that when the piston P is moving to the right of Figure 1, most of the steam in front of the piston will exhaust through the port 2 and conduit 2a and only a small amount of this steam will pass through the port 4 and conduit 4a into the chamber 29. This small amount of steam entering the chamber 29 can escape through the restricted passage formed between the rod 18 and valve V and through the port 32. However, as soon as the piston passes the port 4 the live steam will enter the chamber 29 through the conduit 4a and due to the restricted passage this live steam cannot escape fast enough to prevent it from building up a pressure in the chamber which will cause the valve V to move to the position shown in Figure 2, as above set forth.

When the enlargement 14 at the right hand side of the transverse center of the sliding valve V passes to the left of port 2b communication is established between this port and the chamber 27 while at the same time the enlargement 14 at the left hand side of the transverse center of the valve V passes to the left of port 1b establishing communication between this port and chamber 25 as shown in Fig. 2 and therefore live steam from the intake I will pass through conduit 12, port 12b, chamber 27, conduit 2a and port 2 into the cylinder C at the right of the piston P for moving the piston P to the left in Fig. 2. Upon movement of the piston P in this last named direction, the exhausting steam will pass through port 1, conduit 1a, port 1b, chamber 25, and from the chamber 25 through conduit 7 to the exhaust E. Also, as piston P continues its movement toward the left in Fig. 2, a portion of the live steam will be diverted through the branch 2c, passing from said branch through the port 2d into chamber 31 to build up a pressure in said chamber. When the pressure in chamber 31 becomes greater than the pressure in chamber 30, auxiliary valve 19 will be forced toward the enlargement 16 thus forcing, in turn, the auxiliary valve 17 away from the enlargement 15. As a result of this displacement of the auxiliary valve communication between port 4b and chamber 29 will be closed while communication between port 3b and chamber 28 will be established as will be clear from a study of Fig. 3. During this operation, pressure in chamber 29 will be released, the steam therein exhausting therefrom around the tie rod 18 through the bore of the valve V and from said bore of the valve through the port 32 into chamber 25 and from chamber 25 passing through port 7b and conduit 7 to the exhaust E.

The position of the parts are now such as to permit a reversal of the operation above set out upon the opening of port 3 to live steam upon the completion of the stroke of piston P.

Under light operating conditions, steam valve V in Fig. 3 will remain in position as illustrated in Fig. 2. The restricted passage formed between the rod 18 and the walls of the bore of the valve V, under these conditions will be sufficient for such light operation.

Under normal operating conditions, the steam valve V will move to position as illustrated in Fig. 3 due to the momentary retained pressure in chamber 29 which is sufficient to hold steam valve V against auxiliary valve 17, during the movement of auxiliary valves 17 and 19 to the left.

In the form of the invention shown in Figs. 6, 7, 8 and 9, it will be noted, with reference to the conduit 3a, conduit 1a and its branch 1c that in this second form of the invention branch 1c is eliminated and in lieu thereof conduit 3a is provided with a branch 3c that connects the conduit 3a with the port 1d.

Similarly, branch 2c of conduit 2a has been eliminated and conduit 4a is provided with a branch 4c that connects the conduit 4a with the port 2d.

Now with regard to the valve mechanism it will be seen that in this second form of the invention, the slide valve indicated by the reference numerals 17a and 19a respectively are of less width or thickness than the corresponding valve of the first form of the invention, the slide valve 17a, 19a being respectively of a thickness as to require but a single packing ring as clearly shown in Fig. 7. This form of invention operates in the following manner. The main positions of valve V and auxiliary valves 17a and 19a have been illustrated in Figs. 6, 8 and 9. Supposing the parts to be located as shown in Fig. 6, and the pistons P is moving from left to right, it will be seen that the steam from the intake I passes through conduit 11, port 11b, chamber 26, conduit 1a, into the cylinder C at the left hand end of the cylinder forcing the piston towards the right in Fig. 6. The steam will also be admitted from cylinder C into conduit 3a and branch conduit 3c into chamber 30 building up a pressure therein holding valves 17a and 19a in the position illustrated in Fig. 6. It will also be apparent that under such conditions steam in the cylinder C at the right hand side of piston P is simultaneously being ejected through port 4, conduit 4a, into chamber 29, passing around tie rod 18, through the bore in slide valve V to passage 32 where it exhausts from the chamber 25. The steam is further being exhausted through port 2, conduit 2a, port 2b, chamber 25, conduit 7 to exhaust E. When the piston approaches the right hand end of the cylinder C, it will close port 4 and when it reaches the terminus of its movement in this direction, port 4 will be opened as clearly illustrated in Fig. 8, whereby live steam coming from port 1 passes through port 4, conduit 4a, into chamber 29 where it will build up a pressure so as to cause valve V to move to the position shown in Fig. 8, resulting in the closing of communication between the port 11b, chamber 26, port 1b, as well as the closing of communication between the ports 2b, and 7b and chamber 25. At the same time, steam will be diverted through the branch 4c, through port 2d, into chamber 31 to build up a pressure in said chamber. When the pressure in chamber 31 becomes greater than the pressure in chamber 30, auxiliary valve 19a will be forced toward the enlargement 16 thus forcing in turn the auxiliary valve 17a away from enlargement 15. As a result of this displacement of the auxiliary valve, communication between port 4b and chamber 29 will be closed while communication between 3b and chamber 28 will be established as will be clear from a study of Fig. 9. When the enlargement 14 at the right hand side of the transverse center of the sliding valve V passes to the left of port 2b communication is established between this port and the chamber 27, and at the same time the enlargement 14 at the left hand of the transverse center of the valve V passes left of port 1b, establishing communication between this port and chamber 25 as shown in Fig. 8 and therefore live steam from intake I will pass through conduit 12, port 12b, chamber 27, conduit 2a, port 2b, into the cylinder C at the right of piston P in its last named direction. The exhausting steam will pass through port 1, conduit 1a, port 1b, chamber 25 and from the chamber 25 through conduit 7, to the exhaust E, also as the piston P continues its movement toward the left in Fig. 9, a portion of live steam will divert through port 4, conduit 4a, and through port 4b into chamber 31 and through branch 4c, port 2d, into the same chamber building up a pressure therein holding auxiliary valve 19 and 17 as illustrated in Fig. 9. The position of the parts are now such as to permit the reversal of the operation above set out upon the opening of port 3 to live steam upon the completion of stroke of piston P.

I claim:

1. In combination, a cylinder, a piston mounted for reciprocation within said cylinder, a valve casing, a slide valve within said casing and provided intermediate its ends with a pair of spaced enlargements, and at each end thereof with an additional enlargement, said slide valve having an axial bore and a transverse bore, the latter being disposed between the ends of the slide valve, a rod loosely fitting in the axial bore of the slide valve, and auxiliary valves fixed on the ends of said rod; conduits extending from opposite ends of the cylinder to the valve casing intermediate the ends of the valve casing, branches extending from said conduits to the ends of the valve casing, other conduits extending from points inwardly from the ends of the cylinder to points inwardly from the ends of the valve casing, a steam intake having conduits connected with the valve casing at points intermediate the first and second named conduits, and an exhaust conduit leading from the valve casing at a point midway between the first named conduits as and for the purpose specified.

2. In a slide valve gear, in combination, a cylinder, a piston adapted to reciprocate within said cylinder, a slide valve, a casing for said valve, conduits connecting the cylinder with the valve casing for the conducting of steam between the cylinder and valve casing, a centrally located exhaust for the valve casing, said slide valve having a passage for steam extending axially therethrough, and lateral outlet means for the passage intermediate the ends of the valve, a loosely fitting rod extending through the passage, auxiliary valves on the end of said rod, branch conduits connecting certain of the first named conduits with the ends of the valve casing for the admission of steam into said casing at the sides of the auxiliary valve opposite to the sliding valve, and intake means for live steam connected with the valve casing at opposite sides of the transverse center of said casing.

3. In combination, a cylinder, a piston mounted for reciprocation within said cylinder, a valve casing, a slide valve within said casing and provided intermediate its ends with a pair of spaced enlargements, and at each end thereof with an additional enlargement, said slide valve having an axial bore and a transverse bore, the latter being disposed between the ends of the slide valve, a rod loosely fitting in the axial bore of the slide valve, and auxiliary valves fixed on the ends of said rod; conduits extending from said opposite ends of the cylinder to the valve casing intermediate the ends of the valve casing, other conduits extending from points inwardly from the ends of the cylinder to points slightly spaced inwardly from the ends of the valve casing, branches extending from the first named conduit to the ends of the valve casing, a steam intake having conduits connected with the valve casing at points intermediate the first and second named conduits, and an exhaust conduit leading from the valve casing at a point midway between the first named conduits as and for the purpose specified.

JOHN HELENBERG.